US010124907B1

(12) United States Patent
Gavrilets et al.

(10) Patent No.: US 10,124,907 B1
(45) Date of Patent: Nov. 13, 2018

(54) AUTOROTATION GUIDANCE COMMAND SYSTEM, DEVICE, AND METHOD

(71) Applicant: Rockwell Collins, Inc., Cedar Rapids, IA (US)

(72) Inventors: Vladislav Gavrilets, McLean, VA (US); Maxime M. Gariel, Sterling, VA (US); Robert M. Caplinger, Lenexa, KS (US); Bryan M. Krawiec, Herndon, VA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 105 days.

(21) Appl. No.: 15/227,539

(22) Filed: Aug. 3, 2016

(51) Int. Cl.
*B64D 45/08* (2006.01)
*G08G 5/02* (2006.01)
*G08G 5/00* (2006.01)

(52) U.S. Cl.
CPC ........... *B64D 45/08* (2013.01); *G08G 5/0021* (2013.01); *G08G 5/0034* (2013.01); *G08G 5/025* (2013.01)

(58) Field of Classification Search
CPC .... B64D 45/08; G08G 5/0021; G08G 5/0034; G08G 5/0025
See application file for complete search history.

(56) References Cited

U.S. PATENT DOCUMENTS 9,242,727 B1 * 1/2016 Alvarez ................ B64C 27/006
2007/0164167 A1 * 7/2007 Bachelder ............. G05D 1/105 244/220
2011/0174925 A1 * 7/2011 Ying ....................... B64F 1/005 244/114 R
2011/0266809 A1 * 11/2011 Calverley ................. F03D 5/00 290/55
2016/0304190 A1 * 10/2016 Grohmann .............. B64C 13/46
2017/0243505 A1 * 8/2017 Dimock ................... G09B 9/46
2018/0129226 A1 * 5/2018 Rogers .................. B64C 27/006

OTHER PUBLICATIONS

D.B. Jourdan et al., Enhancing UAV Survivability Through Damage Tolerant Control, AIAA Guidance, Navigation, and Control Conference, Aug. 2-5, 2010, Toronto, Ontario Canada, p. 1-26.

* cited by examiner

*Primary Examiner* — Behrang Badii
*Assistant Examiner* — Daniel L Greene
(74) *Attorney, Agent, or Firm* — Angel N. Gerdzhikov; Donna P. Suchy; Daniel M. Barbieri

(57) ABSTRACT

An avionics computing device of an aircraft including a rotor may include a non-transitory computer-readable medium and a processor communicatively coupled to the non-transitory computer-readable medium. Upon an occurrence of a condition indicative of a requirement to perform an autorotation maneuver, the processor may be configured to generate autorotation guidance commands based on a generated feasible three-dimensional autorotation trajectory. The generated feasible three-dimensional autorotation trajectory may be for the autorotation maneuver of an aircraft including a rotor. The generated autorotation guidance commands may be configured to guide a pilot of the aircraft to perform the autorotation maneuver of the aircraft along the generated feasible three-dimensional autorotation trajectory. The processor may further be configured to output data associated with the generated autorotation guidance commands to an input/output device for presentation to the pilot.

18 Claims, 9 Drawing Sheets

226
AIRSPEED SETPOINT 702
ATTITUDE COMMAND 704
VERTICAL SPEED SETPOINT 710
HEADING SETPOINT 708
ROTORSPEED 706

AUTOROTATION GUIDANCE COMMAND SYSTEM, DEVICE, AND METHOD

BACKGROUND

With respect to a helicopter, autorotation refers to a descending maneuver when the helicopter's engine is disengaged from the helicopter's main rotor system such that the rotor blades are driven solely by an upward flow of air through the rotor rather than being driven by engine power. Autorotation is often caused by a main rotor's engine failure, a main rotor's engine malfunction, or a loss of tail-rotor effectiveness.

Performance of a successful autorotation maneuver by a helicopter pilot may allow for a relatively safe landing of the helicopter upon the occurrence of a complete engine failure in the helicopter. Failure to perform a successful autorotation maneuver can result in catastrophic consequences. Autorotation is a labor-intensive and difficult maneuver to execute, with little margin for error. Successful helicopter autorotation maneuvers are especially challenging when a helicopter has an engine malfunction in a degraded visual environments (DVE) such that a helicopter pilot might not be able to see terrain and obstructions while trying to safely land the helicopter. Due to difficulty and safety implications related to helicopter autorotation maneuvers, helicopter pilots engage in significant and continued training related to autorotation.

SUMMARY

In one aspect, embodiments of the inventive concepts disclosed herein are directed to an avionics computing device of an aircraft including a rotor. The avionics computing device may include a non-transitory computer-readable medium and a processor communicatively coupled to the non-transitory computer-readable medium. Upon an occurrence of a condition indicative of a requirement to perform an autorotation maneuver, the processor may be configured to generate autorotation guidance commands based on a generated feasible three-dimensional autorotation trajectory. The generated feasible three-dimensional autorotation trajectory may be for the autorotation maneuver of an aircraft including a rotor. The generated autorotation guidance commands may be configured to guide a pilot of the aircraft to perform the autorotation maneuver of the aircraft along the generated feasible three-dimensional autorotation trajectory. The processor may further be configured to output data associated with the generated autorotation guidance commands to an input/output device for presentation to the pilot.

In a further aspect, embodiments of the inventive concepts disclosed herein are directed to a system of an aircraft including a rotor. The system may include a non-transitory computer-readable medium and a processor communicatively coupled to the non-transitory computer-readable medium. Upon an occurrence of a condition indicative of a requirement to perform an autorotation maneuver, the processor may be configured to generate autorotation guidance commands based on a generated feasible three-dimensional autorotation trajectory. The generated feasible three-dimensional autorotation trajectory may be for the autorotation maneuver of an aircraft including a rotor. The generated autorotation guidance commands may be configured to guide a pilot of the aircraft to perform the autorotation maneuver of the aircraft along the generated feasible three-dimensional autorotation trajectory. The processor may further be configured to output data associated with the generated autorotation guidance commands to an input/output device for presentation to the pilot.

In a further aspect, embodiments of the inventive concepts disclosed herein are directed to method. The method may include, upon an occurrence of a condition indicative of a requirement to perform an autorotation maneuver, generating, by a processor of an aircraft including a rotor, autorotation guidance commands based on a generated feasible three-dimensional autorotation trajectory. The generated feasible three-dimensional autorotation trajectory may be for the autorotation maneuver of the aircraft. The generated autorotation guidance commands may be configured to guide a pilot of the aircraft to perform the autorotation maneuver of the aircraft along the generated feasible three-dimensional autorotation trajectory. The method may further include outputting, by the processor of the aircraft, data associated with the generated autorotation guidance commands to an input/output device for presentation to the pilot.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
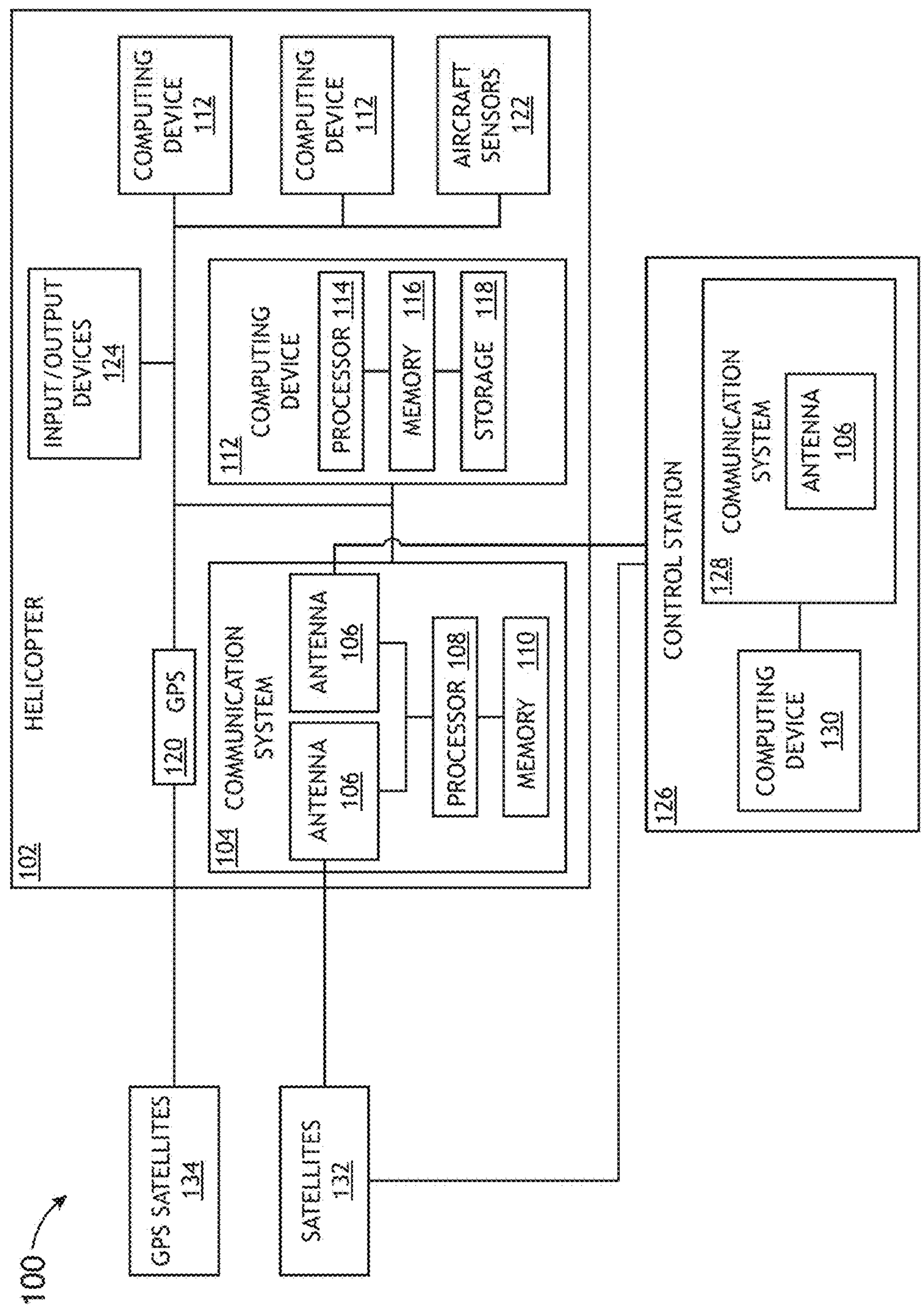
FIG. 1 is a view of an exemplary embodiment of a system including a helicopter, a control station, satellites, and global positioning system (GPS) satellites according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method, system, and at least one device. Some embodiments may include determining an occurrence of a condition indicative of a requirement to perform an autorotation maneuver in an aircraft (e.g., a helicopter), such as based on a rotor engine malfunction or failure. Upon the occurrence of the condition indicative of the requirement to perform the autorotation maneuver, some embodiments may include determining where in a flight envelope the autorotation occurred. Some embodiments may include determining a feasible (e.g., a most feasible) landing zone, such as by selecting a feasible landing zone from a plurality of possible landing zones of a landing zone database stored in a non-transitory computer-readable medium or by identifying a feasible landing zone based at least on data received from aircraft sensors. Some embodiments may include generating a three-dimensional trajectory from a position and orientation of the helicopter to the determined feasible landing zone. Some embodiments may include generating and outputting guidance cues to at least one input/output device (e.g., at least one output device; e.g., as at least one display (e.g., at least one head-down display (HDD), at least one head-up display (HUD), and/or at least one head-worn display (e.g., helmet-mounted display)), via at least one speaker, or a combination thereof). Some embodiments may include presenting (e.g., graphically displaying and/or audibly annunciating) guidance cues to the pilot, such as via at least one display and/or via at least one speaker. For example, such guidance cues may include trajectory tracking guidance cues, approach guidance cues, and roll guidance cues. Embodiments may be configured to significantly reduce a pilot's workload during autorotation and increase the likelihood that the pilot is able to successfully complete an autorotation maneuver safely. Additionally, when a helicopter is operated in a degraded visual environment, embodiments may increase the likelihood that the pilot is able to successfully complete an autorotation maneuver safely by providing valuable guidance cues to guide the pilot when the pilot's visual perception of terrain and structures might be obscured. Embodiments are configured to reduce the likelihood of a crash landing during autorotation and increase the likelihood of a safe landing during autorotation.

For example, a database stored in a non-transitory computer-readable medium onboard a helicopter may contain landing zones in a vicinity of an area where the helicopter flies. Such landing zones may be pre-loaded into the non-transitory computer-readable medium or added to the database during flight, such as in response a manual selection by a pilot or in response to a processor of the helicopter automatically selecting one or more landing zones. At any given moment or repeatedly, the processor may be configured to search through the database of landing zones, and select one landing zone from the database, whereby the one selected landing zone would result in a determined (e.g., predicted) highest chance for successfully completing autorotation in the event that there would be a need to perform autorotation. For example, the processor may be configured to continuously and/or repeatedly perform the task of selecting one landing zone, which would result in a highest chance of successfully completing autorotation at any given time, including, for example, before any need for autorotation and while no autorotation is necessary. As such, the processor may be configured to continuously and/or repeatedly generate (e.g., construct) a trajectory (e.g., a most feasible three-dimensional autorotation trajectory) from a current location of the helicopter to the most recently selected one landing zone so that the trajectory is immediately available when autorotation is initiated. Additionally, upon initiation of autorotation, the processor may be configured to generate guidance cues and output the guidance cues to a display (e.g., a HDD or a head-worn display) for presentation to the pilot. The guidance cues may be configured to guide the pilot to steer the helicopter along the trajectory.

Additionally, some embodiments include providing guidance commands (e.g., guidance cues) to guide a pilot to safely landing in an automatically selected landing zone following loss of tail rotor control.

Embodiments may be implemented in any suitable aircraft having at least one rotor, such as helicopters. For example, embodiments may be implemented in a helicopter including a single main rotor and a single tail rotor or any other suitable number(s) and type(s) of rotors (e.g., main rotors and/or tail rotors). For example, some embodiments may be applicable to single engine helicopters, as well as twin engine helicopters forced to perform autorotation not only in case of complete loss of propulsion (which may be an unlikely event) but also in an occurrence of loss of tail rotor control (e.g., due to a mechanical failure or due to battle damage, such as a hit with a rocket propelled grenade).

Referring now to FIG. 1, an exemplary embodiment of a system 100 according to the inventive concepts disclosed herein includes at least one aircraft (e.g., helicopter 102), a control station 126, satellites 132, and global positioning system (GPS) satellites 134. Some or all of the helicopter 102, the control station 126, the satellites 132, and the GPS satellites 134 may be communicatively coupled at any given time.

The helicopter 102 includes at least one communication system 104, a plurality of computing devices 112 (which may also be referred to as aircraft computing devices, vetronics computing devices (e.g., avionics computing devices), helicopter computing devices, or vehicular computing devices as may be appropriate), a GPS device 120, aircraft sensors 122, and input/output devices 124, as well as other systems, equipment, and devices commonly included in aircraft (e.g., helicopters). Some or all of the communication system 104, the computing devices 112, the GPS device 120, the aircraft sensors 122, the input/output devices 124, and any other systems, equipment, and devices commonly included in the helicopter 102 may be communicatively coupled. While not shown, in some embodiments, the helicopter 102 may optionally include a network operations center (NOC) or include components (e.g., at least one computing device 112 and/or the communication system 104) configured to perform functionality similar to a NOC. The helicopter 102 may be implemented as any suitable aircraft including at least one rotor, such as a conventional single main rotor, single tail rotor helicopter, or a helicopter with any suitable number(s) and type(s) of rotors (e.g., main rotors and/or tail rotors). While the system 100 is exemplarily shown as including the helicopter 102, in some embodiments the inventive concepts disclosed herein may be implemented in or on computing devices of any suitable aircraft including at least one rotor or in any suitable environment.

The communication system 104 includes one or more antennas 106 (e.g., two antennas 106, as shown), a processor 108, and memory 110, which are communicatively coupled. The communication system 104 (such as via one or more of the antennas 106) is configured to send and/or receive signals, data, messages, and/or voice transmissions to and/or from the control station 126, other vehicles, the satellites 132, and combinations thereof, as well as any other suitable devices, equipment, or systems. That is, the communication system 104 is configured to exchange (e.g., bi-directionally exchange) signals, data, messages, and/or voice communications with any other suitable communication system (e.g., which may be implemented similarly and function similarly to the communication system 104). Additionally, for example, the communication system 104 may be configured to exchange, send, and/or receive (e.g., via a wireless connection, a cabled connection, and/or a wired connection, a passenger broadband service connection, a safety services connection, or a combination thereof) signals, data, messages, and/or voice communications with, to, and/or from any suitable onboard device(s).

The communication system 104 may include at least one processor 108 configured to run or execute various software applications, computer code, and/or instructions stored (e.g., maintained) in at least one non-transitory computer-readable medium (e.g., at least one computer-readable medium implemented as hardware; e.g., at least one non-transitory processor-readable medium, at least one memory 110 (e.g., at least one nonvolatile memory, at least one volatile memory, or a combination thereof; e.g., at least one random-access memory, at least one flash memory, at least one read-only memory (ROM) (e.g., at least one electrically erasable programmable ROM (EEPROM), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof). Some or all of the at least one computer-readable medium may be communicatively coupled. For example, the processor 108 may be configured to receive data from the computing devices 112 and execute instructions configured to cause a particular antenna of the antennas 106 to transmit the data as a signal(s) to another communication system (e.g., 128) of the system 100. Likewise, for example, the processor 108 may be configured to route data received as a signal(s) by a particular antenna of the antennas 106 to one or more of the computing devices 112. In some embodiments, the processor 108 may be implemented as one or more radiofrequency (RF) processors.

Each of the antennas 106 may be implemented as or may include any suitable antenna or antenna device. For example, the antennas 106 may be implemented as or include at least one electronically scanned array (ESA) (e.g., at least one active ESA (AESA)), at least one radio (e.g., at least one software defined radio (SDR)), at least one transmitter, at least one receiver, at least one transceiver, or a combination thereof.

While the communication system 104 is shown as having two antennas 106, one processor 108, and memory 110, the communication system 104 may include any suitable number of antennas 106, processors 108, and memory 110. Further, the communication system 104 may include other components, such as a storage device (e.g., solid state drive or hard disk drive), radio tuners, and controllers.

Each of the computing devices 112 of the helicopter 102 may include at least one processor 114, memory 116, and storage 118, as well as other components, equipment, and/or devices commonly included in a computing device, all of which may be communicatively coupled to one another. Each of the computing devices 112 may be configured to route data to each other as well as to the communication system 104 for transmission to an off-board destination (e.g., satellites 132, control station 126, or a combination thereof). Likewise, each computing device 112 may be configured to receive data from another computing device 112 as well as from the communication system 104 transmitted from off-board sources (e.g., satellites 132, control station 126, or a combination thereof). The computing device 112 may include or may be implemented as and/or be configured to perform the functionality of any suitable aircraft system, such as flight management system (FMS) (e.g., 112-1), a processing and video generation system computing device (e.g., 112-2), an engine indication and crew alerting system (EICAS) computing device, an integrated flight information system (IFIS) computing device, an information management system (IMS) computing device, an onboard maintenance system (OMS) computing device, and a terrain awareness and warning system (TAWS) computing device. The processor 114 may be configured to run various software applications or computer code stored (e.g., maintained) in a non-transitory computer-readable medium (e.g., at least one computer-readable medium implemented as hardware; e.g., at least one non-transitory processor-readable medium, at least one memory 116 (e.g., at least one nonvolatile memory, at least one volatile memory, or a combination thereof; e.g., at least one random-access memory, at least one flash memory, at least one read-only memory (ROM) (e.g., at least one electrically erasable programmable ROM (EEPROM), at least one on-processor memory (e.g., at least one on-processor cache, at least one on-processor buffer, at least one on-processor flash memory, at least one on-processor EEPROM, or a combination thereof), or a combination thereof), at least one storage device 118 (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof) and configured to execute various instructions or operations. Additionally, for example, the computing devices 112 or the processors 114 may be implemented as special purpose computers or special purpose processors configured (e.g., programmed) to execute instructions for performing any or all of the operations disclosed throughout. In some embodiments, the helicopter 102 may include any suitable number of computing devices 112.

The GPS device 120 receives location data from the GPS satellites 134 and may provide vehicular location data (e.g., aircraft location data) to any of various equipment/systems of the helicopter 102 (e.g., the communication system 104, the computing devices 112, the aircraft sensors 122, and the input/output devices 124). For example, the GPS device 120 may be implemented as a global navigation satellite system (GNSS) device, and the GPS satellites 134 may be implemented as GNSS satellites. The GPS device 120 may include a GPS receiver and a processor. For example, the GPS device 120 may receive or calculate location data from a sufficient number (e.g., at least four) of GPS satellites 134 in view of the helicopter 102 such that a GPS solution may be calculated. In some embodiments, the GPS device 120 may be implemented as or as part of a computing device 112, the communication system 104, navigation sensors of the aircraft sensors 122, and/or one of the input/output devices 124. The GPS device 120 may be configured to provide the location data to any of various equipment/systems of a vehicle. For example, the GPS device 120 may provide location data to the computing devices 112, the communication system 104, and the input/output devices 124. Further, while FIG. 1 depicts the GPS device 120 implemented in the helicopter 102, in other embodiments, the GPS device 120 may be implemented in or on any type of aircraft.

While the communication system 104, the computing devices 112, the GPS device 120, the aircraft sensors 122, and the input/output devices 124 of the helicopter 102 have been exemplarily depicted as being implemented as separate devices or systems, in some embodiments, some or all of the communication system 104, the computing devices 112, the GPS device 120, the aircraft sensors 122, and/or the input/output devices 124 may be implemented as a single integrated system or device or as any number of integrated and/or partially integrated systems and/or devices.

The control station 126 includes at least one communication system 128 and at least one computing device 130, as well as other systems, equipment, and devices commonly included in a control station. Some or all of the communication system 128, the computing device 130, and other systems, equipment, and devices commonly included in a control station may be communicatively coupled. The control station 126 may be implemented as a fixed location ground control station (e.g., a ground control station of an air traffic control tower, or a ground control station of a network operations center) located on the ground of the earth. In some embodiments, the control station 126 may be implemented as a mobile ground control station (e.g., a ground control station implemented on a non-airborne vehicle (e.g., an automobile or a ship) or a trailer). In some embodiments, the control station 126 may be implemented as an air control station implemented on an airborne vehicle (e.g., aircraft). The control station 126 may include a network operations center (NOC) or be communicatively coupled to a NOC (e.g., via any suitable network(s)).

The communication system 128 and components thereof (such as antenna 106) of the control station 126 may be implemented similarly to the communication system 104 except that, in some embodiments, the communication system 128 may be configured for operation at a fixed location. The computing device 130 and components thereof (such as a processor (not shown) and memory (not shown)) of the control station 126 may be implemented similarly to the computing devices 112.

While the antennas 106 are exemplarily depicted as being implemented in the helicopter 102 and the control station 126, in some embodiments, antennas 106 may be implemented in, on, or coupled to any other suitable device, equipment, or system, such as a computing device (e.g., a laptop computing device, a mobile computing, a wearable computing device, or a smart phone), a mobile communication system (e.g., a man pack communication system), or satellites 132.

While FIG. 1 exemplarily includes elements as shown, in some embodiments, one or more of the elements of the system 100 may be omitted, or the system 100 may include other elements. For example, one or more of the GPS satellites 134, satellites 132, and the control station 126 may be optional. Additionally, while an embodiment has been depicted as including one control station (e.g., the control station 126), other embodiments may include any number of control stations of various types positioned or moving anywhere in the system 100.

Figure 2:
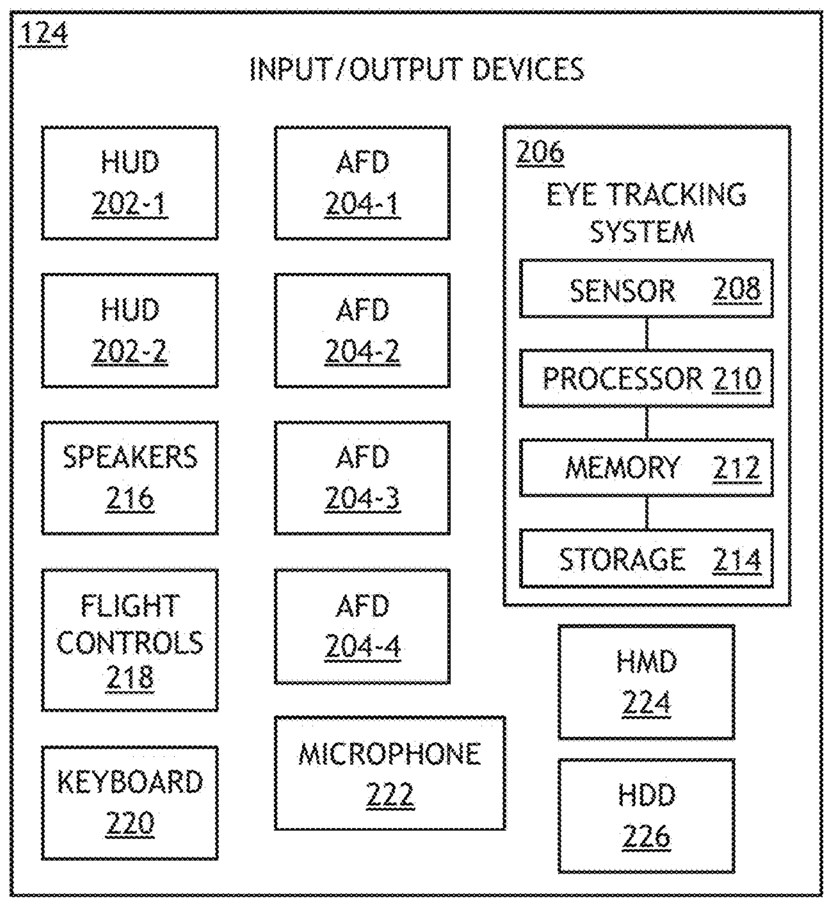
FIG. 2 is a view of the input/output devices of the helicopter of FIG. 1 according to the inventive concepts disclosed herein.

Referring now to FIG. 2, the input/output devices 124 of the helicopter 102 of FIG. 1 may include one or more displays (e.g., at least one head-up display (HUD), at least one adaptive flight display (AFD), at least one head-down display (HDD), at least one head-worn display (e.g., at least one helmet-worn display and/or at least one binocular display) or a combination thereof), at least one eye tracking system 206, speakers 216, flight controls 218, at least one keyboard 220, at least one microphone 222, or a combination thereof, some or all of which may be communicatively coupled at any given time. While FIG. 2 depicts the various exemplary input/output devices 124, the input/output devices 124 may include any suitable input/output devices.

The input/output devices 124 may be configured to present guidance commands (e.g., guidance cues) to a pilot of the helicopter 102. For example, the speakers 216 may be configured to audibly present audible guidance commands (e.g., guidance cues) to the pilot of the helicopter 102. For example, one or more of the displays may be configured to present visual guidance commands (e.g., guidance cues) to the pilot of the helicopter. Additionally, for example, one or more of the displays may be configured to present synthetic vision content (e.g., streams of images as synthetic vision video), why may be used when the helicopter 102 is in a degraded visual environment.

For example, the displays of the input/output devices 124 may include two HUDs 202-1, 202-2 (which may collectively be referred to as HUDs 202), four AFDs 204-1, 204-2, 204-3, 204-4 (which may collectively be referred to as AFDs 204), a head worn display (e.g., HMD 224), and a head-down display (HDD) 226. In some embodiments, the AFDs 204 are implemented as HDDs. Each of the displays may be configured to present streams of images (e.g., as video or still images) to a user (e.g., a helicopter pilot). In some embodiments, the HUDs 202, AFDs 204, and/or the HDD 226 may be implemented as or include a touchscreen display. In some embodiments, one or more of the HUDs 202, AFDs 204, HDD 226, and/or the HMD 224 may include an integrated computing device (which may be implemented and function similarly to one of the computing devices 112 of FIG. 1) and/or integrated computing device components (which may be implemented and function similarly to components of one of the computing devices 112 of FIG. 1). In some embodiments, the helicopter 102 may include any suitable number of any suitable types of displays. For example, the helicopter 102 may include two HDDs 226, such as a first HDD 226 for a pilot and second HDD 226 for a copilot. Each of the displays may be communicatively coupled to one or more of the computing devices 112, the communication system 104, the GPS device 120, other of the input/output devices 124, and/or the aircraft sensors 122 of FIG. 1.

The eye tracking system 206 is configured to track eye gestures, track movement of a user's eye, track a user's gaze, and/or otherwise receive inputs from a user's eyes. The eye tracking system 206 may be configured for performing fully automatic eye tracking operations of users in real time. The eye tracking system 206 may include at least one sensor 208, at least one processor 210, a memory 212, and a storage 214, as well as other components, equipment, and/or devices commonly included in an eye tracking system. The sensor 208, the processor 210, the memory 212, and the storage 214, as well as the other components, equipment, and/or devices commonly included in the eye tracking system 206 may be communicatively coupled.

Each sensor 208 may be implemented as any of various sensors suitable for an eye tracking system. For example, the at least one sensor 208 may include or be implemented as one or more optical sensors (e.g., at least one camera configured to capture images in the visible light spectrum and/or the infrared spectrum). In some embodiments, the at least one sensor 208 is one or more dedicated eye tracking system sensors. While the sensor 208 has been exemplarily depicted as being included in the eye tracking system 206, in some embodiments, the sensor 208 may be implemented external to the eye tracking system 206. For example, the sensor 208 may be implemented as an optical sensor (e.g., of the optical sensors 316 of the aircraft sensors 122) located within the helicopter 102 and communicatively coupled to the processor 210.

The processor 210 may be configured to process data received from the sensor 208 and output processed data to one or more onboard devices or onboard systems (e.g., the communication system 104, the computing devices 112, the aircraft sensors 122, other of the input/output devices 124, or a combination thereof). For example, the processor 210 may be configured to generate eye tracking data and output the generated eye tracking data to one of the computing devices 112. The processor 210 of the eye tracking system 206 may be configured to run various software applications or computer code stored (e.g., maintained) in a non-transitory computer-readable medium (e.g., memory 212 and/or storage 214) and configured to execute various instructions or operations. The processor 210 may be implemented as a special purpose processor configured to execute instructions for performing any or all of the operations disclosed throughout.

In some embodiments, some or all of the input/output devices 124 may include an integrated computing device (which may be implemented and function similarly to one of the computing devices 112 of FIG. 1) and/or integrated computing device components (which may be implemented and function similarly to components of one of the computing devices 112 of FIG. 1).

Figure 3:
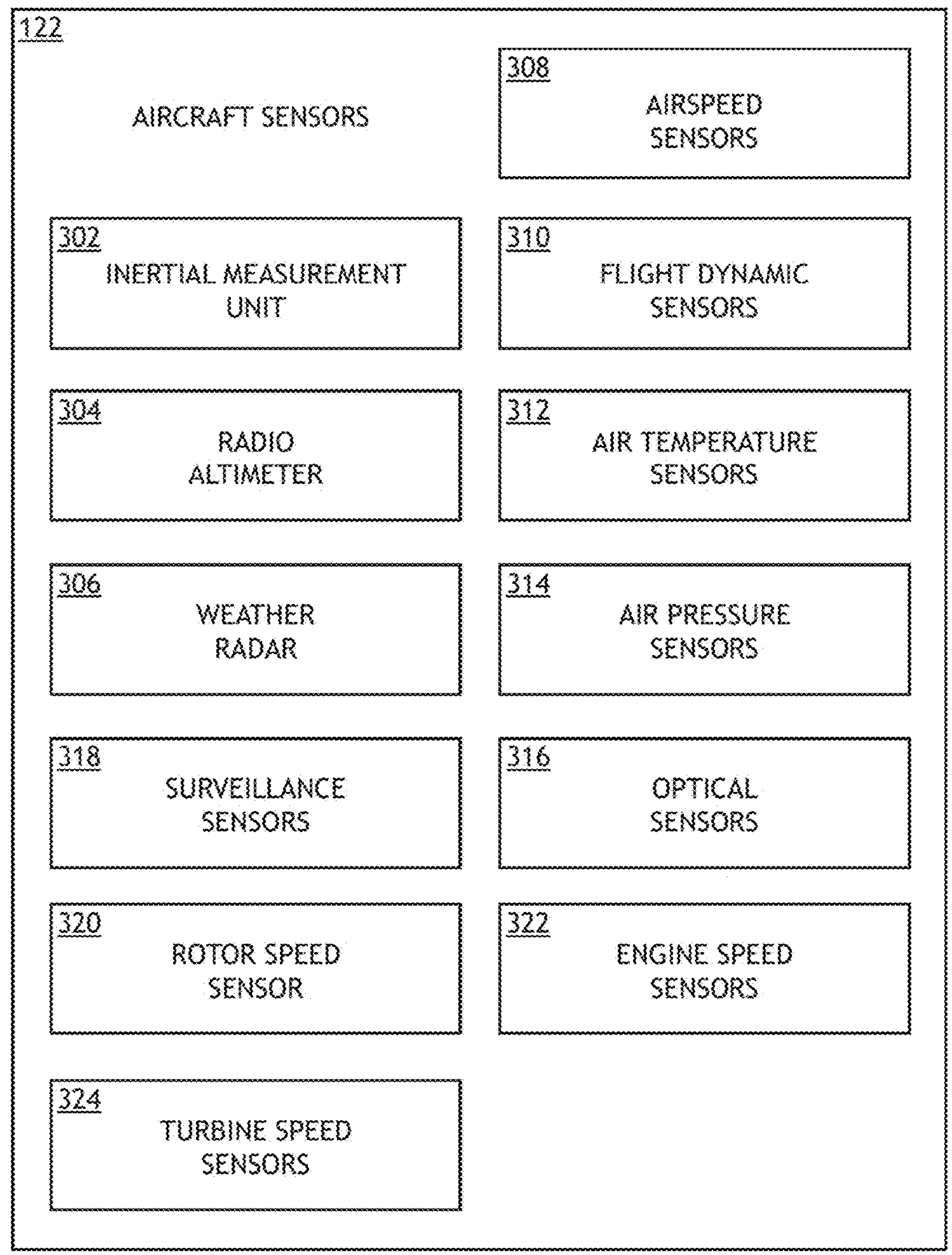
FIG. 3 is a view of the aircraft sensors of the helicopter of FIG. 1 according to the inventive concepts disclosed herein.

Referring now to FIG. 3, the aircraft sensors 122 (which may also be referred to as helicopter sensors) of FIG. 1 are shown. Each of the aircraft sensors 122 may be configured to sense a particular condition(s) external or internal to the helicopter 102 or within the helicopter 102 and output data associated with particular sensed condition(s) to one or more onboard devices or onboard systems (e.g., the communication system 104, the computing devices 112, the aircraft sensors 122, the input/output devices 124, or a combination thereof). For example, the aircraft sensors 122 may include an inertial measurement unit 302, a radio altimeter 304, weather radar 306, airspeed sensors 308, flight dynamic sensors 310 (e.g., configured to sense pitch, bank, roll, heading, and/or yaw), air temperature sensors 312, air pressure sensors 314, optical sensors 316 (e.g., cameras configured to capture images in the visible light spectrum and/or the infrared spectrum), surveillance sensors 318, rotor speed sensor 320, engine speed sensor 322, and turbine speed sensor 324, some or all of which may be communicatively coupled at any given time. Additionally, the GPS device 120 may be considered as one of the aircraft sensors 122.

For example, at least some of the aircraft sensors 122 may be implemented as navigation sensors (e.g., the GPS device 120, the inertial measurement unit 302, a radio altimeter 304, weather radar 306, airspeed sensors 308, flight dynamic sensors 310, air temperature sensors 312, and/or air pressure sensors 314) configured to sense any of various flight conditions (e.g., helicopter flight conditions) or aircraft conditions (e.g., helicopter conditions) typically used by aircraft (e.g., helicopters) and output navigation data (e.g., aircraft location data, aircraft orientation data, aircraft direction data, aircraft speed data, and/or aircraft acceleration data). For example, various flight conditions or aircraft conditions may include altitude, aircraft location (e.g., relative to the earth), aircraft orientation (e.g., relative to the earth), aircraft speed, aircraft acceleration, aircraft trajectory, at least one rotor speed (e.g., at least one main rotor speed, at least one tail rotor speed, or combination thereof), aircraft pitch, aircraft bank, aircraft roll, aircraft yaw, aircraft heading, air temperature, and/or air pressure. For example, the GPS device 120 and the inertial measurement unit 302 may provide aircraft location data and aircraft orientation data, respectively, to a processor (e.g., a processor of the GPS device 120, processor 114, processor 114-1, processor 114-2, processor 108, processor 210, or a combination thereof).

For example, the rotor speed sensor 320 may be configured to measure the rotational speed of the rotor and configured to detect variations of rotation speed. The engine speed sensor 322 may be configured to measure the rotation speed of the engine speed and variations of the engine speed. The turbine speed sensor 324 may be configured to measure the rotational speed of the engine output shaft and configured to detect variations of rotation speed.

In some embodiments, some or all of the aircraft sensors 122 may include an integrated computing device (which may be implemented and function similarly to one of the computing devices 112 of FIG. 1) and/or integrated computing device components (which may be implemented and function similarly to components of one of the computing devices 112 of FIG. 1).

Further, while the aircraft sensors 122 are implemented in or on the helicopter 102, some embodiments may include the aircraft sensors 122 implemented on any suitable aircraft according to the inventive concepts disclosed herein.

Figure 4:
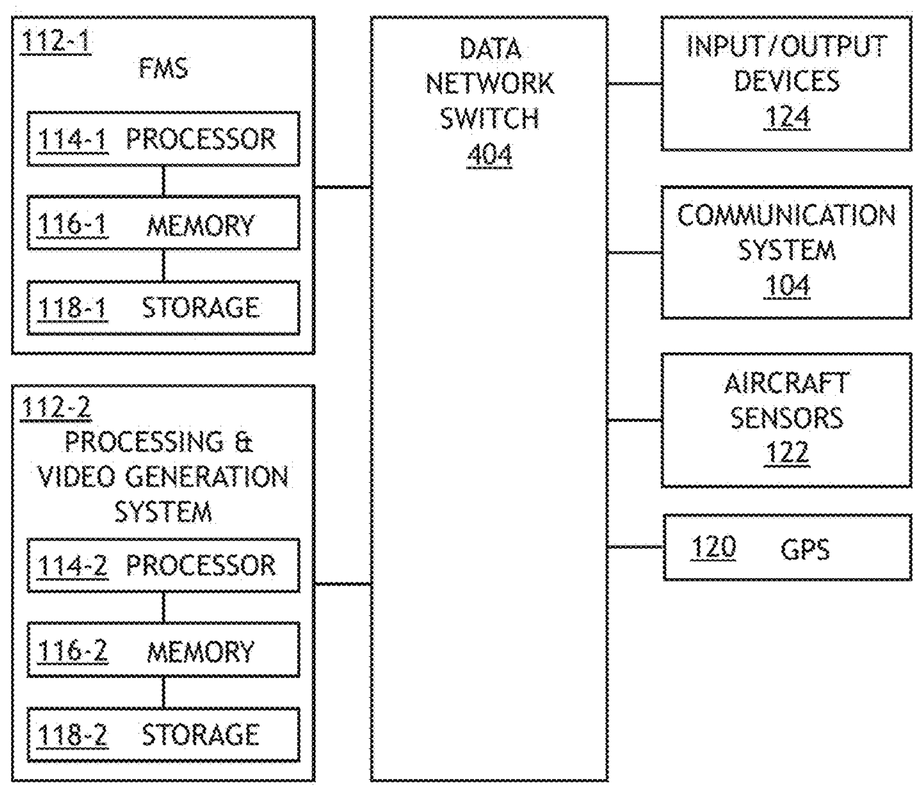
FIG. 4 is a view of exemplary devices of the helicopter of FIG. 1 communicatively coupled via a data network switch of an exemplary embodiment according to the inventive concepts disclosed herein.

Referring now to FIG. 4, various exemplary devices of the helicopter 102 of FIG. 1 communicatively coupled via a data network switch 404 (e.g., an avionics full-duplex Ethernet (AFDX) switch) are shown. For example, a plurality of computing devices 112, the input/output devices 124, the communication system 104, the aircraft sensors 122, and the GPS device 120 may be communicatively coupled via the data network switch 404. While the plurality of computing devices 112, the input/output devices 124, the communication system 104, the aircraft sensors 122, and the GPS device 120 are exemplarily shown as being communicatively coupled via the data network switch 404, in some embodiments some or all of the plurality of computing devices 112, the input/output devices 124, the communication system 104, the aircraft sensors 122, and the GPS device 120 may be communicatively coupled via any suitable data networks and via any suitable data networking components (e.g., at least one bus (e.g., Aeronautical Radio, Incorporated (ARINC) 429 busses), at least one data concentrator, at least one switch, at least one router, or a combination thereof).

The plurality of computing devices 112 may be implemented as and/or include a plurality of avionics computing devices (e.g., which may be implemented in one or more integrated modular avionics (IMA) cabinets). The plurality of avionics computing devices may include an FMS computing device 112-1 and a processing and video generation system computing device 112-2. Additionally, the input/output devices 124, the communication system 104, the aircraft sensors 122, the data network switch 404, and the GPS device 120 may be considered to be devices of the plurality of avionics computing devices and may be implemented similarly as and function similarly as avionics devices (e.g., 112-1, 112-2) as disclosed throughout. Each of the plurality of avionics computing devices (e.g., 112-1, 112-2) may include components, which may be implemented and function similarly as the components of the computing device 112 shown and described with respect to FIG. 1. As such, each of the plurality of avionics computing devices may include at least one processor, memory, and storage, which may be implemented and function similarly as the processor 114, the memory 116, and the storage 118, respectively, of the computing device 112 shown and described with respect to FIG. 1. For example, the FMS computing device 112-1 may include a processor 114-1, memory 116-1, and storage 118-1, which may be implemented and function similarly as the processor 114, the memory 116, and the storage 118, respectively, of the computing device 112 shown and described with respect to FIG. 1. Additionally, for example, the processing and video generation system computing device 112-2 may include a processor 114-2, memory 116-2, and storage 118-2, which may be implemented and function similarly as the processor 114, the memory 116, and the storage 118, respectively, of the computing device 112 shown and described with respect to FIG. 1.

The plurality of avionics computing devices (e.g., 112-1, 112-2) and/or processors thereof (e.g., 114-1, 114-2) may be implemented as special purpose computers (e.g., the FMS computing device 112-1, the processing and video generation system computing device 112-2) and/or special purpose processors (e.g., the processor 114-1 of the FMS computing device 112-1 programmed to execute instructions for performing FMS operations as disclosed throughout, the processor 114-2 of the processing and video generation system computing device 112-2 programmed to execute instructions for performing processing and video generation operations as disclosed throughout) configured to execute instructions for performing any or all of the operations disclosed throughout.

The FMS computing device 112-1 may be configured to automate various in-flight tasks, such as managing a flight plan of the helicopter 102. The processor 114-1 of the FMS computing device 112-1 may be configured to perform any of various, suitable operations, which are commonly performed by FMSs, as would be appreciated by those skilled in the art. In addition to performing commonly performed operations, some embodiments include the processor 114-1 of the FMS computing device 112-1 being configured (e.g., programmed) to perform additional operations.

For example, the processor 114-1 may be configured to determine an occurrence of a condition indicative of a requirement to perform an autorotation maneuver, such as based on a rotor engine malfunction or failure. Upon the occurrence of the condition indicative of the requirement to perform the autorotation maneuver, the processor 114-1 may be configured to determine where in a flight envelope the condition indicative of the requirement to perform the autorotation maneuver occurred, such as in a dangerous zone, a hover zone (e.g., low altitude hover zone), a low speed (LS) takeoff zone, or a normal operating zone (See FIG. 5).

Based at least in part on where in a flight envelope the autorotation occurred, the processor 114-1 may be configured to determine a feasible (e.g., a most feasible) landing zone, such as by selecting a feasible landing zone from a plurality of possible landing zones of a landing zone data structure (e.g., a landing zone database) stored in a non-transitory computer-readable medium (e.g., memory 116-1 and/or storage 118-1) or by identifying a feasible landing zone based at least on data received from the aircraft sensors 122. For example, a most feasible landing zone may be a landing zone that is most likely to result in a successful autorotation.

In some embodiments, the processor 114-1 being configured to determine a most feasible landing zone may include the processor 114-1 being configured to perform multiple operations. For example, the processor 114-1 may be configured to determine (e.g., select and/or identify) a plurality (e.g., some or all) of candidate landing zones, such as by selecting a plurality of possible landing zones of a landing zone data structure (e.g., a landing zone database) stored in a non-transitory computer-readable medium (e.g., memory 116-1 and/or storage 118-1) and/or by identifying possible landing zones based at least on data received from the aircraft sensors 122. Additionally, the processor 114-1 may be configured to determine a feasibility of reaching a particular candidate landing zone during autorotation for each of the plurality of candidate landing zones. For example, determining the feasibility of reaching a particular candidate landing zone during autorotation for each of the plurality of candidate landing zones may include determining the feasibility of reaching a particular candidate landing zone during autorotation for each of the plurality of candidate landing zones based at least on one or more factors. For example, the one or more factors may include any or all of the following: a shallowest autorotation glideslope with respect to airspeed (e.g., corresponding to an optimum airspeed for autorotation and recommended autorotation rotorspeed); a wind estimate(s) along the trajectory and at the landing zone, if available; an assumed wind estimate uncertainty(ies) along the trajectory and at the landing zone; and/or a direction of final approach to the landing zone. If the processor 114-1 determines that more than one of the plurality of candidate landing zones are feasible (e.g., feasible-to-reach) landing zones, the processor 114-1 may be configured to determine that a particular feasible landing zone having a largest altitude to spare is the most feasible landing zone.

The processor 114-1 may be configured to generate (e.g., construct) a three-dimensional trajectory from a position and orientation of the helicopter 102 to the determined feasible landing zone. For example, the three-dimensional trajectory may be a three-dimensional Dubins path trajectory as described with respect to and illustrated in FIG. 6. The processor 114-1 may be configured to output the generated three-dimensional trajectory to the processing and video generation system 112-2 and/or a different onboard or off-board computing device.

In some embodiments, even when the helicopter 102 has a normally functioning (e.g., non-autorotation operational) rotor, the processor 114-1 of the FMS 112-1 may be configured to repeatedly (e.g., constantly or frequently) determine a current feasible landing zone and generate a current three-dimensional trajectory from a current position and orientation of the helicopter 102 to the determined current feasible landing zone. By repeatedly determining a current feasible landing zone and generating a current three-dimensional trajectory, the processor 114-1 is able to immediately provide (e.g., output) the current feasible landing zone and the generated current three-dimensional trajectory to the processing and video generation system 112-2 and/or a different onboard or off-board computing device upon the determination that the helicopter 102 is experiencing autorotation. By immediately being able to provide the current feasible landing zone and the generated current three-dimensional trajectory once autorotation is detected, the processor 114-1 does not have to spend additional time to determine the current feasible landing zone and generate the current three-dimensional trajectory because the current feasible landing zone and the generated current three-dimensional trajectory is already available. Immediately being able to provide the current feasible landing zone and the generated current three-dimensional trajectory saves valuable time and may increase the likelihood of a pilot being able to perform a safe and successful autorotation landing. In some embodiments, such feasibility check for landing zones may be performed iteratively and repeatedly (e.g., constantly) during operation of the helicopter 102.

In some embodiments, upon outputting the generated three-dimensional trajectory (e.g., the generated current three-dimensional trajectory), the processor 114-1 may be configured to determine (e.g., by receiving data from the aircraft sensors 122, such as the GPS device 120, the radio altimeter 304, the airspeed sensors 308, rotor speed sensor 320, engine speed sensor 322, turbine speed sensor 324, flight dynamic sensors 310, and/or the inertial measurement unit 302) at least one aircraft state (e.g., position, orientation, and/or detected trajectory) of the helicopter 102 in real time. The processor 114-1 may be configured to output (e.g., constantly output or frequently output) data associated with the at least one determined aircraft state of the helicopter 102 to the processing and video generation system computing device 112-2 for use in presenting (e.g., graphically and/or audibly presenting) such information to the pilot of the helicopter 102. The processor 114-1 may also be configured to compare (e.g., iteratively compare or constantly compare) the at least one determined aircraft state of the helicopter 102 against the generated three-dimensional trajectory. By comparing the at least one determined aircraft state of the helicopter 102 against the generated three-dimensional trajectory, the processor 114-1 may be configured to determine at least one deviation (e.g., a lateral position deviation, a vertical position deviation, an airspeed deviation (e.g., a vertical descent rate deviation, a lateral airspeed deviation), an orientation deviation, or a combination thereof) of the helicopter 102 from the generated three-dimensional trajectory. The processor 114-1 may be configured to output data associated with the at least one deviation to the processing and video generation system 112-2 and/or a different onboard or off-board computing device.

In some embodiments, upon or while comparing (e.g., iteratively comparing or constantly comparing) the at least one determined aircraft state of the helicopter 102 against the generated three-dimensional trajectory and/or upon or while determining the at least one deviation of the helicopter 102 from the generated three-dimensional trajectory, the processor 114-1 may be configured to determine that the generated three-dimensional trajectory is unfeasible or is a non-optimal feasible three-dimensional trajectory for safely performing an autorotation maneuver of the helicopter 102. In response to determining that the generated three-dimensional trajectory is unfeasible or is a non-optimal feasible three-dimensional trajectory, the processor 114-1 may be configured to output a generated updated three-dimensional trajectory (e.g., a generated updated most feasible three-dimensional trajectory). In some embodiments, the processor 114-1 may have already generated the generated updated three-dimensional trajectory based at least on a feasible landing zone (e.g., most feasible landing zone) by repeatedly determining a current feasible landing zone and generating a current three-dimensional trajectory so that the processor 114-1 is able to immediately provide (e.g., output) the generated updated three-dimensional trajectory to the processing and video generation system 112-2 and/or a different onboard or off-board computing device.

In some embodiments, the processor 114-1 of the FMS computing device 112-1 may be configured to perform functionality of the processing and video generation system computing device 112-2 as described below and throughout. For example, the FMS computing device 112-1 may include an integrated processing and video generation system, and the FMS computing device 112-1 may be programmed to perform functionality of the processing and video generation system computing device 112-2 as described below and throughout. In such embodiments, the processing and video generation system computing device 112-2 may be optional.

The FMS 112-1 may include software, code, and/or processor-executable instructions stored (e.g., maintained) in a non-transitory computer-readable medium (e.g., the memory 116-1 and/or storage 118-1). By executing the software, code, and/or processor-executable instructions, the processor 114-1 may be configured to perform any of various FMS operations according to inventive concepts as disclosed throughout.

The processing and video generation system computing device 112-2 may be configured to receive data from any of various onboard or off-board devices. For example, the processing and video generation system computing device 112-2 may be configured to receive FMS data (e.g., data associated with a flight plan, at least one determined aircraft state, a current determined feasible landing zone, and/or a generated current three-dimensional trajectory). Additionally, for example, the processing and video generation system computing device 112-2 may be configured to exchange (e.g., send and/or receive) data with one or more of the input/output devices 124, the communication system 104, the aircraft sensors 122, and the GPS 120.

The processing and video generation system computing device 112-2 may be configured to process data received from any of various computing devices (e.g., the FMS computing device 112-1) and to output data (e.g., video data and/or audio data) to any of various devices (e.g., the input/output devices 124). For example, the processor 114-2 of the processing and video generation system computing device 112-2 may be configured to receive data associated with a flight plan, the at least one determined aircraft state, a current determined feasible landing zone, and/or a generated current three-dimensional trajectory from the FMS computing device 112-1. For example, based at least in part on the received data from the FMS computing device 112-1, the processor 114-2 of the processing and video generation system computing device 112-2 may be configured to generate guidance commands (e.g., steering commands (e.g., steering cues); e.g., guidance cues) to guide the pilot to perform a successful autorotation maneuver along the generated current three-dimensional trajectory. The processor 114-2 may be configured to output data associated with the generated current three-dimensional trajectory and the guidance commands (e.g., guidance cues) to one or more of the input/output devices 124 (e.g., displays and/or the speakers 216).

In some embodiments, the processor 114-2 may be configured to receive the data associated with the at least one determined aircraft state of the helicopter 102 from the FMS system computing device 112-1 for use in presenting (e.g., graphically and/or audibly presenting) such information to the pilot of the helicopter 102. Additionally, the processor 114-2 may be configured to receive data associated with the at least one deviation from the FMS computing device 112-1 and/or a different onboard or off-board computing device. The processor 114-2 may be configured to generate corrective guidance command data associated with corrective guidance commands (e.g., corrective steering commands (e.g., corrective steering cues); e.g., corrective guidance cues) configured to guide a pilot to navigate the helicopter 102 back onto or near the generated three-dimensional trajectory. The processor 114-2 may be configured to output the corrective guidance command data associated with the corrective guidance commands to one or more of the input/output devices 124 (e.g., displays and/or the speakers 216) configured to present the corrective guidance commands to the pilot of the helicopter 102 so as to safely guide the pilot of the helicopter 102 back toward or on to the generated current three-dimensional trajectory for a safe landing.

In some embodiments, the processor 114-2 may be configured to receive a generated updated three-dimensional trajectory (e.g., a generated updated most feasible three-dimensional trajectory) based at least on a currently feasible landing zone and an updated current state of the helicopter 102 from the FMS computing device 112-1. The processor 114-2 may be configured to generate updated guidance command data associated with updated guidance commands (e.g., updated steering commands (e.g., updated steering cues); e.g., updated guidance cues) configured to guide a pilot to navigate the aircraft along or toward the generated updated three-dimensional trajectory. The processor 114-2 may be configured to output the updated guidance command data and data associated with the generated updated three-dimensional trajectory to one or more of the input/output devices 124 (e.g., displays and/or the speakers 216) configured to present the updated guidance commands and the generated updated three-dimensional trajectory to the pilot of the helicopter 102 so as to safely guide the pilot of the helicopter 102 back toward or on to the generated updated three-dimensional trajectory for a safe landing.

In some embodiments, the processing and video generation system computing device 112-2 may be configured to perform synthetic vision system (SVS) functionality, for example, by utilizing synthetic image data to construct real-time synthetic views of the environment (e.g., the world outside of the aircraft) based at least on the at least one determined aircraft state relative to the earth. For example, the processor 114-2 may be configured to perform SVS operations so as to improve the likelihood of safely landing the helicopter 102 during autorotation in in a degraded visual environment, such as rain, fog, darkness, smoke, snow, or dust, where the pilot might not be able to perceive the surrounding environment without synthetic views. In some embodiments, the processor 114-2 may be configured to overlay generated guidance cues on synthetic view video and output the synthetic view video with overlaid generated guidance cues to one or more displays for presentation to a pilot.

In some embodiments, the processor 114-2 of the processing and video generation system computing device 112-2 may be configured to perform functionality of the FMS computing device 112-1 as described above and throughout. For example, the processing and video generation system computing device 112-2 may include an integrated FMS, and the processing and video generation system computing device 112-2 may be programmed to perform functionality of the FMS computing device 112-1 as described above and throughout. In such embodiments, a dedicated FMS computing device may be optional.

Additionally, the processor 114-2 may be configured to perform any of various, suitable operations, which are commonly performed by video processing and/or audio processing computing devices, as would be appreciated by those skilled in the art. In addition to performing commonly performed operations, some embodiments include the processor 114-2 being configured (e.g., programmed) to perform additional operations as disclosed throughout.

The processing and video generation system computing device 112-2 may include software, code, and/or processor-executable instructions stored (e.g., maintained) in a non-transitory computer-readable medium (e.g., the memory 116-2 and/or storage 118-2). By executing the software, code, and/or processor-executable instructions, the processor 114-2 may be configured to perform any of various operations according to inventive concepts as disclosed throughout.

While the FMS computing device 112-1 and the processing and video generation computing device 112-2 of the helicopter 102 have been exemplarily depicted as being implemented as separate avionics computing devices, in some embodiments, some or all of the FMS computing device 112-1 and the processing and video generation computing device 112-2 may be implemented as a single integrated computing device or as any number of integrated and/or partially integrated computing devices.

Additionally, in some embodiments, the data network switch 404 may be implemented similarly as and function similarly to one of the avionics computing devices (e.g., 112-1 and/or 112-2) or include components that function similarly to components of one of the avionics computing devices. For example, the data network switch 404 may include an integrated computing device (which may be implemented and function similarly to one of the computing devices 112 (e.g., one of the avionics computing devices (e.g., 112-1 and/or 112-2)) and/or integrated computing device components (which may be implemented and function similarly to components of one of the computing devices 112 of FIG. 1).

Further, while the plurality of avionics computing devices has been exemplarily depicted and described with respect to FIG. 4 as including the FMS computing device 112-1 and the processing and video generation computing device 112-2, in some embodiments, the plurality of avionics computing devices may omit one or more of the described and depicted avionics computing devices, include additional numbers of such avionics computing devices, and/or include other types of suitable avionics computing devices.

Figure 5:
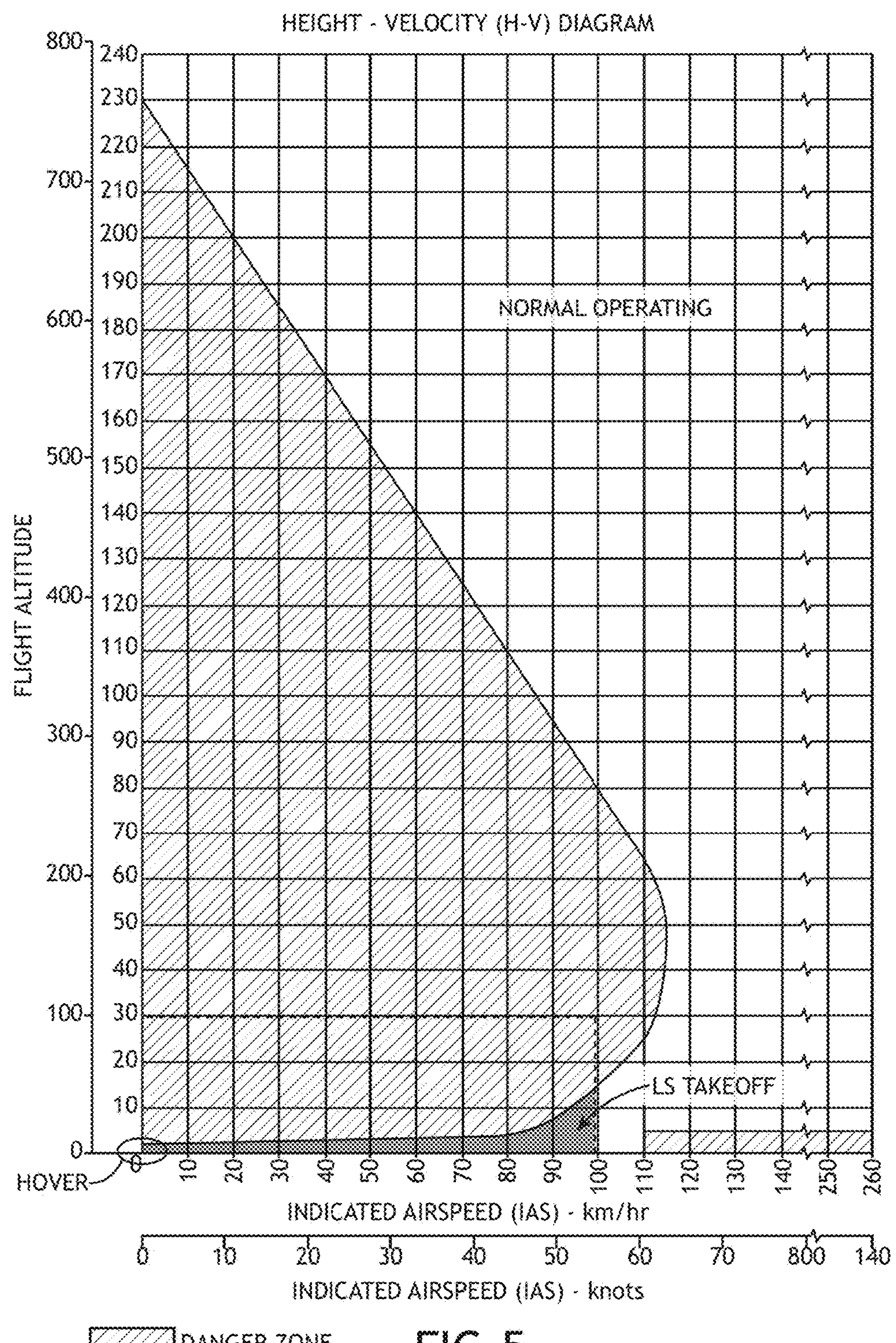
FIG. 5 is an exemplary height-velocity (H-V) diagram associated with the inventive concepts disclosed herein.

Referring now to FIG. 5, an exemplary height-velocity (H-V) diagram associated with the inventive concepts disclosed herein is depicted. The H-V diagram depicts various flight zones of an exemplary flight envelope, such as a dangerous zone, a hover zone (e.g., low altitude hover zone), a low speed (LS) takeoff zone, and a normal operating zone for an exemplary helicopter 102 with respect to an exemplary situation. In some embodiments, operations, such as determining a feasible (e.g., a most feasible) landing zone, generating a three-dimensional trajectory for an autorotation landing maneuver, and generating guidance commands for the pilot of the helicopter 102, may vary based at least on where the helicopter 102 is in the flight envelope. For example, if a conventional single engine helicopter is in the dangerous zone of the flight envelope, a successful and safe autorotation landing may be unlikely. Performance of autorotation actions (e.g., determining a feasible landing zone, generating a three-dimensional trajectory for an autorotation landing maneuver, and generating guidance commands for the pilot of the helicopter 102) may differ depending on where in the safe portion (e.g., a portion in the hover zone, the LS takeoff zone, or the normal operating zone) of the flight envelope an autorotation is initiated.

If autorotation is initiated during low altitude hover (e.g., in the hover zone), the processor 114-2 may generate and output guidance commands directing the pilot of the helicopter 102 to perform collective flare and land immediately. In the hover zone, it might not be feasible to determine a different landing zone. If an autorotation event occurs in the hover zone and in adequate visibility conditions, a trained pilot of the helicopter would typically be able to land the helicopter 102 without guidance cues. Typically, a pilot would perform collective flare to control descent rate, by trading kinetic energy stored in the rotor to slow down the rate of loss of potential energy. Simultaneously, the pilot would maintain as low of a ground speed as is possible (in both forward and lateral direction) using lateral and longitudinal cyclic inputs and maintain current heading using tail rotor control. However, if the autorotation event occurs in a degraded visual environment (DVE), the processor 114-2 may be configured to generate and output guidance cues as setpoints to one or more of the displays (e.g., the HDD 226 or a head-worn display) of the input/output devices 124. For example, appropriate guidance cues as setpoints may include a descent rate setpoint, pitch angle setpoint, and bank angle setpoint to reduce (e.g., minimize) ground speed and a heading angle setpoint to prevent high yaw rate on landing. In some embodiments, if the autorotation event occurs in a degraded visual environment (DVE), the processor 114-2 may be configured to generate and output guidance cues overlaid on generated synthetic vision video.

If autorotation is initiated in the LS takeoff zone (e.g., at a low altitude above ground level (AGL) and at an airspeed below a defined threshold), the processor 114-2 may generate and output guidance commands directing the pilot of the helicopter 102 to perform a sliding autorotation landing. In the LS takeoff zone, it might not be feasible to determine a different landing zone. If an autorotation event occurs in LS takeoff zone and in adequate visibility conditions, a trained pilot of the helicopter 102 would typically be able to land the helicopter 102 without guidance cues. Typically, in such a case, the pilot would slow down the helicopter 102 while keeping the helicopter 102 on the same track and perform a collective flare. However, if the autorotation event occurs in the LS takeoff zone and in a DVE, the processor 114-2 may be configured to generate and output guidance cues similar to the guidance cues for autorotation in the hover zone described above. For example, the processor 114-2 may be configured to generate and output guidance cues as setpoints to one or more of the displays of the input/output devices 124. Appropriate guidance cues as setpoints may include a descent rate setpoint, pitch angle setpoint, and bank angle setpoint to reduce (e.g., minimize) ground speed and a heading angle setpoint to prevent high yaw rate on landing. In some embodiments, if the autorotation event occurs in a DVE, the processor 114-2 may be configured to generate and output guidance cues overlaid on generated synthetic vision video.

If autorotation is initiated in the normal operating zone, the processor 114-1 and/or the processor 114-2 may be configured to perform operations determining a feasible (e.g., a most feasible) landing zone, generating a three-dimensional trajectory for an autorotation landing maneuver, and generating guidance commands for the pilot of the helicopter 102. Upon the determination of an occurrence of a condition indicative of a requirement to perform an autorotation maneuver in the normal operating zone of the flight envelope, the processor 114-1 and/or the processor 114-2 may be configured to perform operations as disclosed throughout, such as described with respect to FIG. 4. For example, generating a three-dimensional trajectory for an autorotation landing maneuver may include constructing a three-dimensional Dubins path trajectory for the autorotation landing maneuver, such as exemplarily described with respect to and illustrated in FIG. 6.

Figure 6:
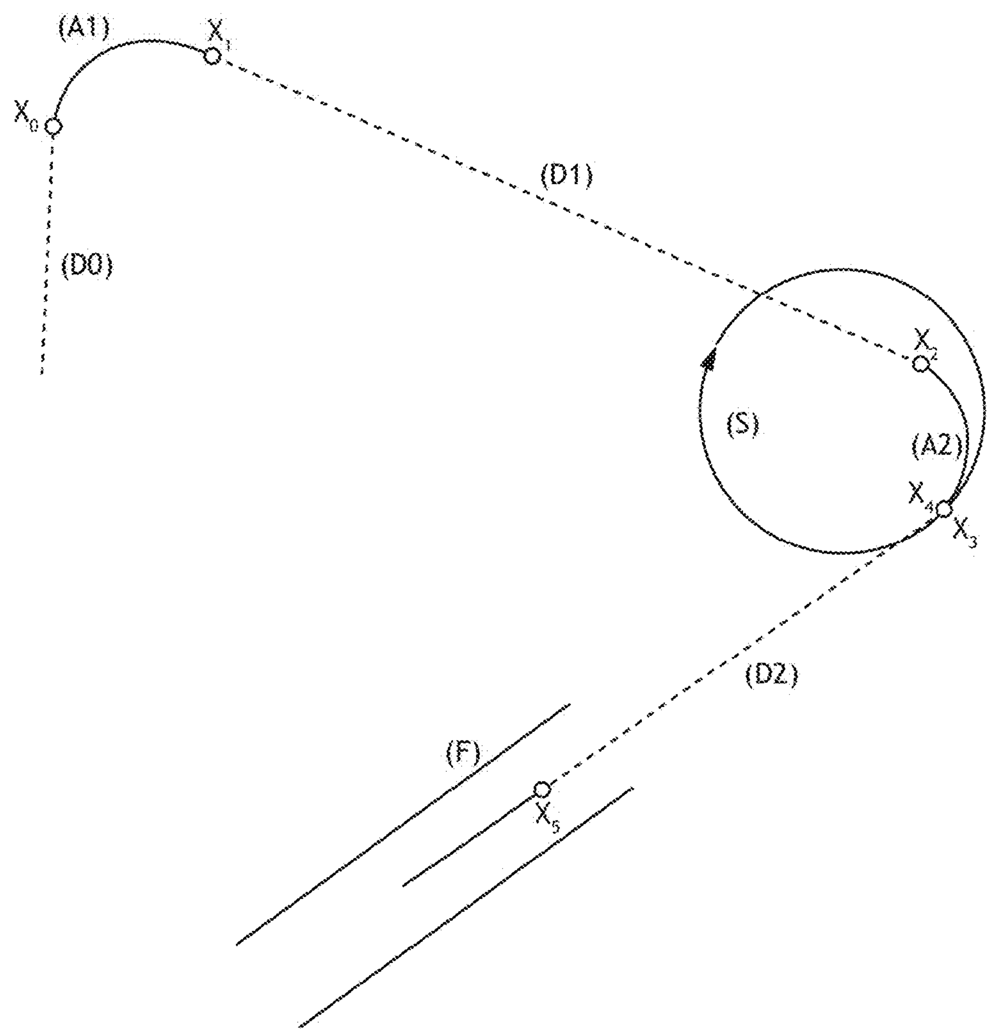
FIG. 6 is a diagram of an exemplary Dubins path associated with an exemplary embodiment of the inventive concepts disclosed herein.

Referring now to FIG. 6, an exemplary Dubins path associated with the inventive concepts disclosed herein is depicted. In some embodiments, a three-dimensional trajectory for an autorotation landing maneuver may be constructed according to a Dubins path. Between prior to an entry point of a Dubins path and a flare point, the three-dimensional Dubins path trajectory for the autorotation landing maneuver may include one or more of the following elements (as shown in FIG. 6):

(D0), a straight segment during which the helicopter 102 establishes stable autorotation;

(A1), an arc (e.g., an "entry arc" of the Dubins path);

(D1), a straight descent;

(A2), an arc (e.g., an "exit arc" of the Dubins path);

(S), a spiral tangent to the final approach;

(D2), a straight descent on the final approach; and (F), a final flare.

At element (D0), upon loss of propulsion, the processor 114-2 may be configured to generate and output a guidance command (e.g., an airspeed setpoint for presentation by a display to the pilot). The pilot may receive the guidance command (e.g., the airspeed setpoint) directing the pilot to acquire a particular (e.g., optimal) airspeed for autorotation. The pilot may adjust collective position throughout the autorotation prior to collective flare to maintain rotorspeed at a desired setpoint. Typically, a rotorspeed gauge is already available on a primary flight display such that no additional indication may be required; however, the processor 114-2 may be optionally configured to generate and output a rotorspeed setpoint, as well. Additionally, the processor 114-2 may be configured to generate and output a wings level bank guidance command for presentation by a display to the pilot until stable autorotation is established.

Elements (A1), (D1), and (A2) refer to Dubins elements (e.g., arcs and straight line segments) for transitioning a helicopter position and course at point x0 (e.g., a start of the Dubins path, when stable autorotation is established) to a helicopter position and course at point x3 (e.g., where the helicopter 102 is aligned with the final approach path in the horizontal plane). The spiral (S) corresponds to the final approach acquisition loiter. The final straight segments (D2) and (F) correspond to the final approach.

Referring still to FIG. 6, the three-dimensional Dubins path trajectory for the autorotation landing maneuver may include one or more of the following points:

x0 is the initial position of the helicopter 102 when the autorotation trajectory is initiated;

x1 is the helicopter position when the helicopter 102 exits (A1);

x2 is the helicopter position when the helicopter 102 enters (A2);

x3 is the helicopter position when the helicopter 102 exits (A2);

x4 is the helicopter position when the helicopter 102 enters the glideslope (D2), and x4 may have the same horizontal position as x3 but at a different (e.g., lower) altitude; and x5 is the point at the top of (F), when the final flare begins.

The points x0 through x3 may define the start and end points of the exemplary Dubins trajectory of FIG. 6, which (as illustrated in two-dimensions in FIG. 6) brings the helicopter 102 to the final approach. Often, the helicopter 102 may have to spiral down (S) once the helicopter 102 reaches x3 in order to intercept point x4 at the correct altitude. Once the helicopter 102 reaches (D2), the helicopter 102 enters the final straight segment. At x5, the helicopter 102 stops tracking altitude and flares to ensure a soft touchdown. In some embodiments, altitude may not necessarily be tracked from the beginning. For example, in some embodiments, the three-dimensional Dubins path trajectory may reduce (e.g., minimize) altitude loss or delay altitude loss for a period of time (e.g., as long as possible). For example, minimizing altitude loss until the last possible moment may improve (e.g., optimize) a robustness of the three-dimensional Dubins path trajectory to reduce (e.g., minimize) effects of wind changes and other uncertainties. If possible, the helicopter 102 may wait until the helicopter's last spiral on (S) before actively tracking altitude. Before then, the helicopter 102 may glide at the helicopter's 102 nominal airspeed with altitude open-loop.

If upon reaching x3, the helicopter 102 has excessive altitude to start the final approach, the processor 114-2 may be configured to generate and output a guidance command directing the pilot to burn excessive altitude by performing an additional spiral (if feasible) or by overshooting the final approach in the horizontal plane and intersecting the final approach at a different point closer to the landing zone.

Figure 7:
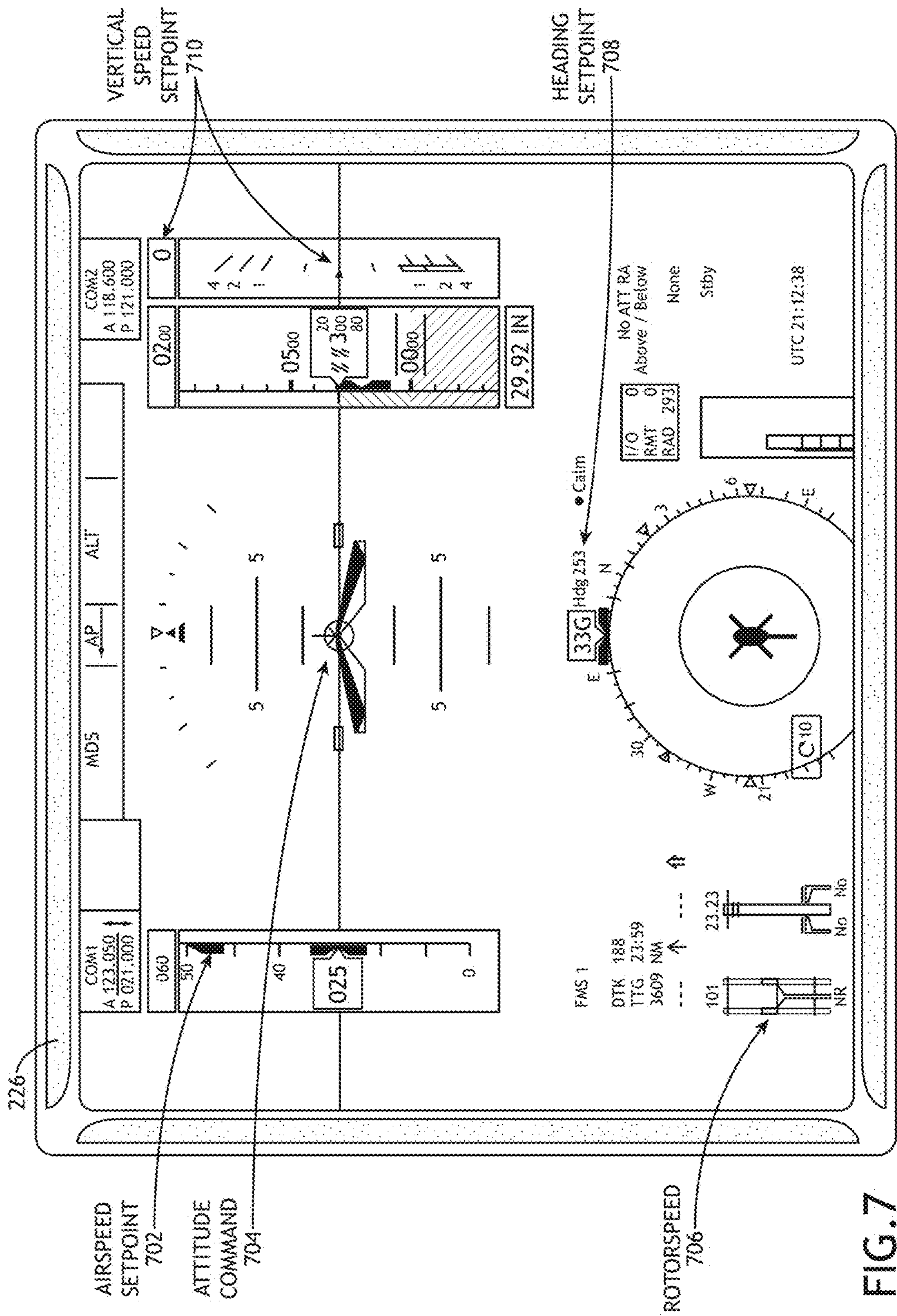
FIG. 7 is an exemplary view of a head-down display (HDD) of the input/output devices of FIG. 2 according to the inventive concepts disclosed herein.
Figure 8:
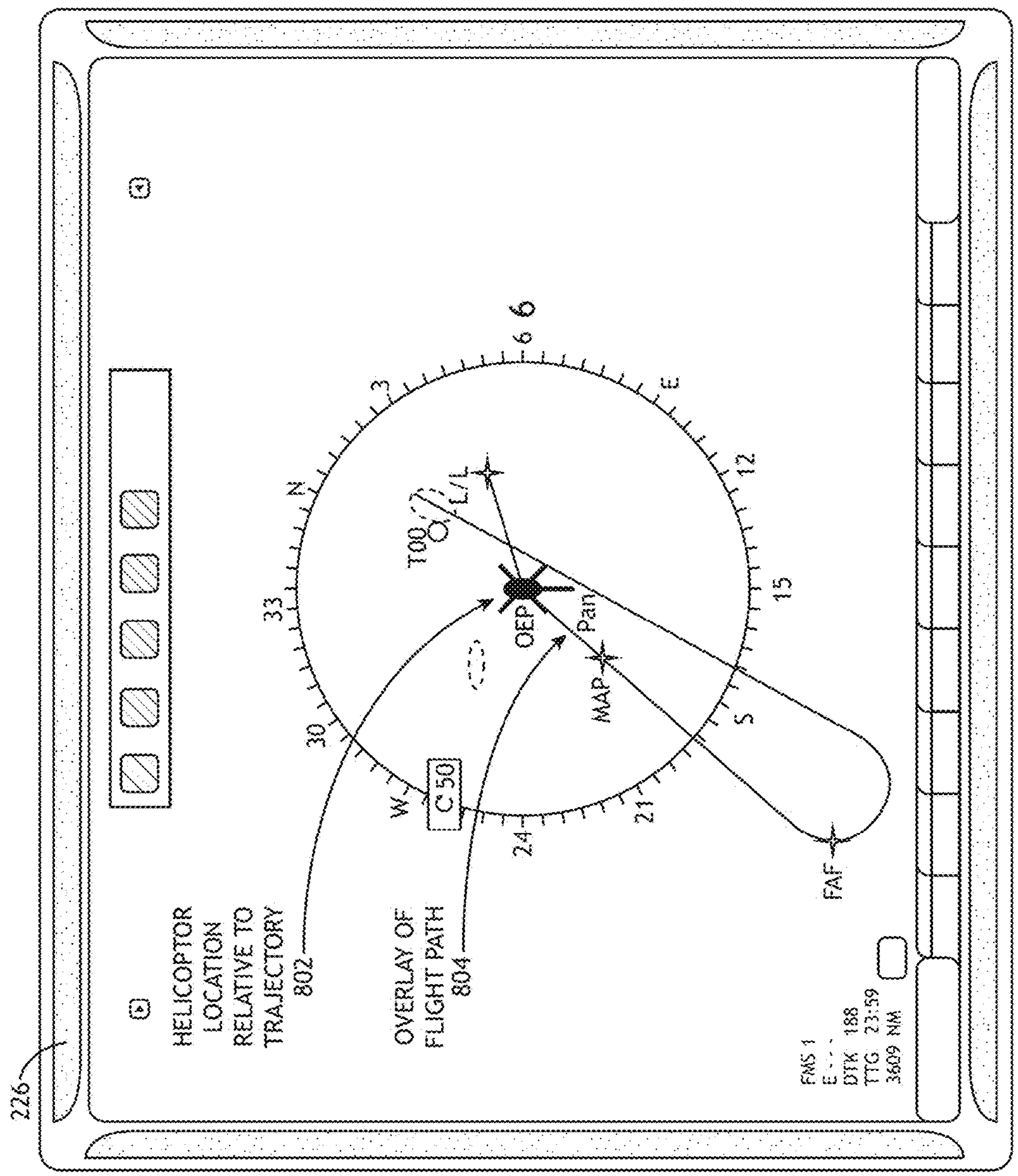
FIG. 8 is an exemplary view of a head-down display (HDD) of the input/output devices of FIG. 2 according to the inventive concepts disclosed herein.

Referring now to FIGS. 7-8, exemplary views of the HDD 226 of the helicopter 102 of FIG. 1 is shown according to the inventive concepts disclosed herein. The HDD 226 may be configured to graphically present graphical content including FMS information and a plurality of guidance commands (e.g., guidance cues). For example, the plurality of guidance commands may include one or more of, but not be limited to, an airspeed setpoint 702, an attitude command 704, rotorspeed setpoint 706, a heading setpoint 708, a vertical speed setpoint 710, a bank angle command, a lateral deviation from the generated three-dimensional autorotation trajectory (e.g., 804), a vertical deviation from the generated three-dimensional autorotation trajectory (e.g., 804, during segments of the generated three-dimensional autorotation trajectory 804 when altitude tracking is used), one or more helicopter positions (e.g., locations) 802 (e.g., as may be displayed on a top view as shown in FIG. 8 and/or on an elevational view) relative to the generated three-dimensional autorotation trajectory (e.g., 804), an entry command into cyclic or collective flare, a pitch angle command, a collective angle command, a ground speed command (e.g., during cyclic flare), a descent rate command (e.g., during collective and cyclic flare), a heading command during flare, a pitch command, and a collective command.

In some embodiments, when altitude is not tracked, the airspeed setpoint 702 remains constant (e.g., equal to an optimum airspeed for autorotation). In some embodiments, when altitude is tracked, the airspeed setpoint 702 may be modulated around a nominal setpoint (e.g., the optimum airspeed for autorotation) to minimize vertical deviation from the desired generated three-dimensional autorotation trajectory (e.g., 804). In some embodiments, the HDD 226 may be configured to display one or more of the guidance commands and/or a portion of one or more of the guidance commands textually (e.g., as alphanumeric characters). Autorotation trajectory guidance commands may be especially valuable during autorotation in a degraded visual environment, and presentation of the guidance cues to a helicopter pilot may allow for a safe landing rather than an almost certain crash.

Additionally, as shown in FIG. 8, the HDD 226 may be configured to graphically present the generated three-dimensional autorotation trajectory 804 (e.g., which is shown as a two-dimensional representation of such three-dimensional trajectory 804).

While the HDD 226 is exemplarily depicted as displaying the generated three-dimensional autorotation trajectory 804 and a plurality of guidance commands in FIGS. 7-8, in some embodiments, any number and/or type(s) of displays of the input/output devices 124 may be configured to display the generated three-dimensional autorotation trajectory 804 and one or more of the plurality of guidance commands. Additionally, while the HDD 226 is exemplarily depicted as graphically presenting a plurality of guidance commands in FIGS. 7-8, in some embodiments, any number and/or type of input/output devices 124 may be configured to present (e.g., graphically present and/or audibly present) one or more of the plurality of guidance commands.

Figure 9:
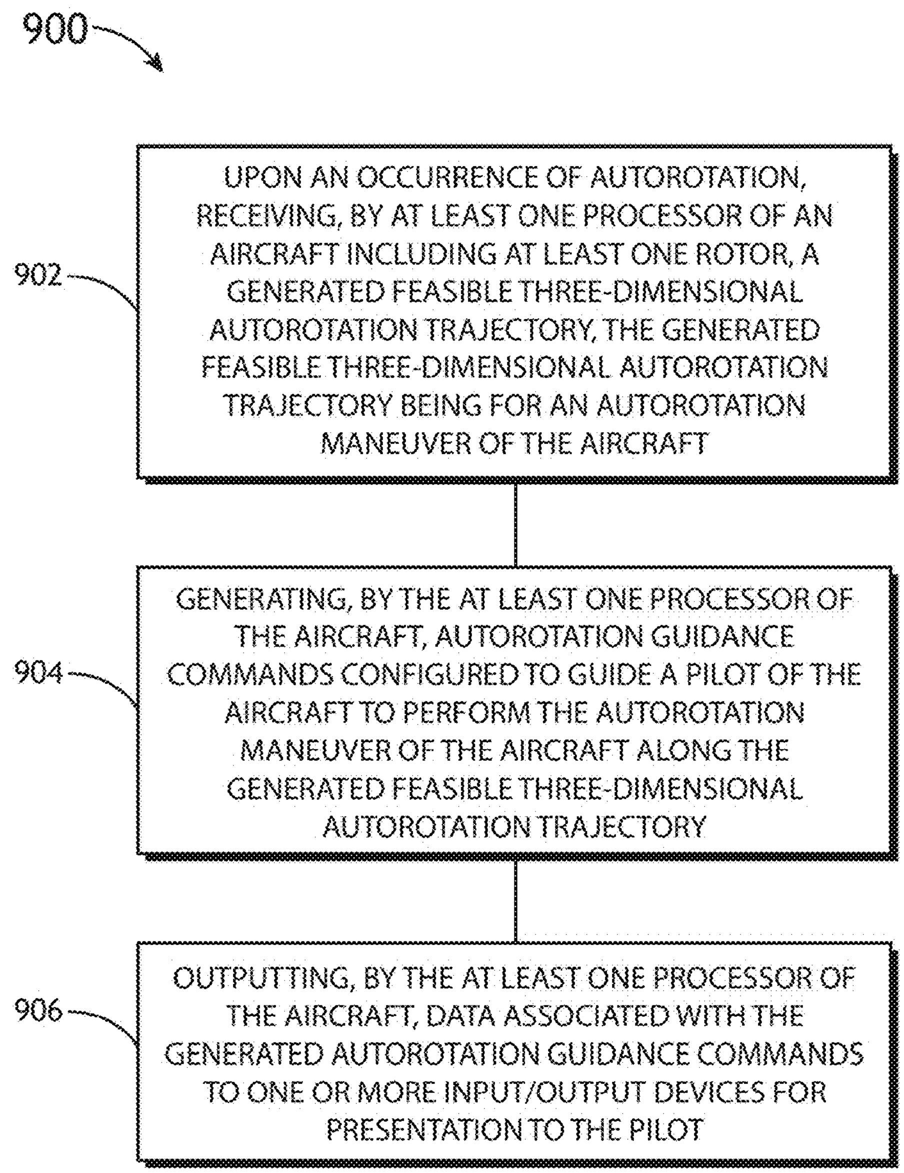
FIG. 9 is a diagram of an exemplary embodiment of a method according to the inventive concepts disclosed herein.

Referring now to FIG. 9, an exemplary embodiment of a method 900 according to the inventive concepts disclosed herein may include one or more of the following steps, which, for example, may be performed by at least one processor (e.g., processor 114, processor 114-1, processor 114-2, or a combination thereof) of at least one computing device 112 (e.g., at least one avionics computing device (e.g., FMS computing device 112-1, processing and video generation computing device 112-2, or a combination thereof)). Additionally, for example, some embodiments may include performing one more instances of the method 900 iteratively, concurrently, and/or sequentially.

A step 902 may include, upon an occurrence of a condition indicative of a requirement to perform an autorotation maneuver, receiving, by at least one processor of an aircraft including at least one rotor, a generated feasible three-dimensional autorotation trajectory, the generated feasible three-dimensional autorotation trajectory being for the autorotation maneuver of the aircraft.

A step 904 may include generating, by the at least one processor of the aircraft, autorotation guidance commands configured to guide a pilot of the aircraft to perform the autorotation maneuver of the aircraft along the generated feasible three-dimensional autorotation trajectory.

A step 906 may include outputting, by the at least one processor of the aircraft, data associated with the generated autorotation guidance commands to one or more input/output devices for presentation to the pilot.

Further, the method 900 may include any of the operations disclosed throughout.

As will be appreciated from the above, embodiments of the inventive concepts disclosed herein may be directed to a method, a system, and at least one device. Some embodiments may include determining a feasible (e.g., a most feasible) landing zone, generating a three-dimensional trajectory for an autorotation landing maneuver, generating guidance commands for the pilot of the helicopter 102, and outputting the generated guidance commands to an output device for presentation to the pilot.

As used throughout and as would be appreciated by those skilled in the art, "at least one non-transitory computer-readable medium" may refer to as at least one non-transitory computer-readable medium (e.g., memory 110, memory 116, memory 212, memory 116-1, memory 116-2, storage 118, storage 214, storage 118-1, storage 118-2, or a combination thereof; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable ROM (EEPROM), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof.

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. An avionics computing device of an aircraft including at least one rotor, the avionics computing device comprising:

at least one non-transitory computer-readable medium; and at least one processor communicatively coupled to the at least one non-transitory computer-readable medium, the at least one processor configured to:

prior to an occurrence of at least one condition indicative of a requirement to perform an autorotation maneuver, repeatedly select a most feasible landing zone from a plurality of feasible landing zones stored in the at least one non-transitory computer-readable medium, wherein the most feasible landing zone is at least based on at least one of: a shallowest autorotation glideslope with respect to airspeed, wind estimates along a trajectory to a particular feasible landing zone, a direction of final approach to a particular feasible landing zone, or a particular feasible landing zone having a largest altitude to spare relative to other of the plurality of feasible landing zones;

upon the occurrence of the at least one condition indicative of the requirement to perform the autorotation maneuver, generate autorotation guidance commands based at least on a generated feasible three-dimensional autorotation trajectory, the generated feasible three-dimensional autorotation trajectory being for the autorotation maneuver of an aircraft including at least one rotor, the generated autorotation guidance commands configured to guide a pilot of the aircraft to perform the autorotation maneuver of the aircraft along the generated feasible three-dimensional autorotation trajectory;

output data associated with the generated autorotation guidance commands to one or more input/output devices for presentation to the pilot;

upon a deviation of at least one aircraft state from the generated feasible three-dimensional autorotation trajectory, generate corrective autorotation guidance commands configured to guide the pilot of the aircraft to navigate the aircraft toward or back onto the generated feasible three-dimensional autorotation trajectory; and output data associated with the generated corrective autorotation guidance commands to at least one of the one or more input/output devices for presentation to the pilot.

2. The avionics computing device of claim 1, wherein the one or more input/output devices include at least one display, wherein the at least one processor is further configured to:

output data associated with the generated feasible three-dimensional autorotation trajectory to the at least one display for presentation to the pilot as the generated feasible three-dimensional autorotation trajectory.

3. The avionics computing device of claim 1, wherein the one or more input/output devices include at least one display, wherein the generated autorotation guidance commands include generated graphical autorotation guidance commands, wherein the at least one processor is further configured to:

output graphical data associated with the generated graphical autorotation guidance commands to the at least one display for presentation to the pilot.

4. The avionics computing device of claim 1, wherein the one or more input/output devices include at least one display and at least one speaker, wherein the generated autorotation guidance commands include generated graphical autorotation guidance commands and at least one generated audible autorotation guidance command, wherein the at least one processor is further configured to:

output graphical data associated with the generated graphical autorotation guidance commands to the at least one display for presentation to the pilot; and output audio data associated with the generated audible autorotation guidance commands to the at least one speaker for presentation to the pilot.

5. The avionics computing device of claim 1, wherein the generated feasible three-dimensional autorotation trajectory is a generated most feasible three-dimensional autorotation trajectory based at least on the most feasible landing zone and at least one aircraft state of the aircraft.

6. The avionics computing device of claim 1, wherein the autorotation guidance commands include at least one autorotation guidance cue.

7. The avionics computing device of claim 1, wherein the at least one processor is further configured to:

generate updated autorotation guidance commands based at least on a generated updated feasible three-dimensional autorotation trajectory, the generated updated feasible three-dimensional autorotation trajectory having been determined to be currently more feasible than the generated feasible three-dimensional autorotation trajectory, the updated autorotation guidance commands configured to guide the pilot of the aircraft to navigate the aircraft along or toward the generated updated feasible three-dimensional autorotation trajectory; and output data associated with the generated updated autorotation guidance commands to the one or more input/output devices for presentation to the pilot.

8. The avionics computing device of claim 1, wherein the at least one processor is further configured to:

generate a feasible three-dimensional autorotation trajectory for use as the generated feasible three-dimensional autorotation trajectory.

9. The computing device of claim 1, wherein the at least one processor is further configured to:

determine at least one aircraft state of the aircraft.

10. The avionics computing device of claim 1, wherein the at least one processor is further configured to:

generate synthetic video of an environment associated with the aircraft; and output data associated with one or more of the generated autorotation guidance commands and the generated synthetic video of the environment to at least one of the one or more input/output devices for graphical presentation to the pilot.

11. The avionics computing device of claim 1, wherein the avionics computing device is implemented as a flight management system (FMS) computing device.

12. The avionics computing device of claim 1, wherein the avionics computing device is implemented as a processing and video generation system computing device.

13. The computing device of claim 1, wherein the at least one processor is further configured to:

determine the occurrence of the at least one condition indicative of the requirement to perform the autorotation maneuver.

14. The computing device of claim 13, wherein the at least one processor is further configured to:

determine where in a flight envelope the at least one condition indicative of the requirement to perform the autorotation maneuver occurred.

15. A system of an aircraft including at least one rotor, the system comprising:

at least one non-transitory computer-readable medium; and at least one processor communicatively coupled to the at least one non-transitory computer-readable medium, the at least one processor configured to:

prior to an occurrence of at least one condition indicative of a requirement to perform an autorotation maneuver, repeatedly select a most feasible landing zone from a plurality of feasible landing zones stored in the at least one non-transitory computer-readable medium, wherein the most feasible landing zone is at least based on at least one of: a shallowest autorotation glideslope with respect to airspeed, wind estimates along a trajectory to a particular feasible landing zone, a direction of final approach to a particular feasible landing zone, or a particular feasible landing zone having a largest altitude to spare relative to other of the plurality of feasible landing zones;

upon the occurrence of the at least one condition indicative of the requirement to perform the autorotation maneuver, generate autorotation guidance commands based at least on a generated feasible three-dimensional autorotation trajectory, the generated feasible three-dimensional autorotation trajectory being for the autorotation maneuver of an aircraft including at least one rotor, the generated autorotation guidance commands configured to guide a pilot of the aircraft to perform the autorotation maneuver of the aircraft along the generated feasible three-dimensional autorotation trajectory;

output data associated with the generated autorotation guidance commands to one or more input/output devices for presentation to the pilot;

upon a deviation of at least one aircraft state from the generated feasible three-dimensional autorotation trajectory, generate corrective autorotation guidance commands configured to guide the pilot of the aircraft to navigate the aircraft toward or back onto the generated feasible three-dimensional autorotation trajectory; and output data associated with the generated corrective autorotation guidance commands to at least one of the one or more input/output devices for presentation to the pilot.

16. The system of claim 15, further comprising the one or more input/output devices, wherein the one or more input/output devices are configured to present the generated autorotation guidance commands to the pilot.

17. The system of claim 16, wherein the one or more input/output devices comprise at least one display configured to graphically present one or more of the generated autorotation guidance commands to the pilot.

18. A method, comprising:

prior to an occurrence of at least one condition indicative of a requirement to perform an autorotation maneuver, repeatedly selecting, by at least one processor of an aircraft including at least one rotor, a most feasible landing zone from a plurality of feasible landing zones stored in the at least one non-transitory computer-readable medium, wherein the most feasible landing zone is at least based on at least one of: a shallowest autorotation glideslope with respect to airspeed, wind estimates along a trajectory to a particular feasible landing zone, a direction of final approach to a particular feasible landing zone, or a particular feasible landing zone having a largest altitude to spare relative to other of the plurality of feasible landing zones;

upon the occurrence of the at least one condition indicative of the requirement to perform the autorotation maneuver, generating, by the at least one processor, autorotation guidance commands based at least on a generated feasible three-dimensional autorotation trajectory, the generated feasible three-dimensional autorotation trajectory being for the autorotation maneuver of the aircraft, the generated autorotation guidance commands configured to guide a pilot of the aircraft to perform the autorotation maneuver of the aircraft along the generated feasible three-dimensional autorotation trajectory;

outputting, by the at least one processor of the aircraft, data associated with the generated autorotation guidance commands to one or more input/output devices for presentation to the pilot;

upon a deviation of at least one aircraft state from the generated feasible three-dimensional autorotation trajectory, generating, by the at least one processor of the aircraft, corrective autorotation guidance commands configured to guide the pilot of the aircraft to navigate the aircraft toward or back onto the generated feasible three-dimensional autorotation trajectory; and outputting, by the at least one processor of the aircraft, data associated with the generated corrective autorotation guidance commands to at least one of the one or more input/output devices for presentation to the pilot.

* * * * *